United States Patent [19]

Torre et al.

[11] 4,331,772

[45] May 25, 1982

[54] METHOD OF MANUFACTURING NITRIDED SILICON PARTS

[75] Inventors: Jean-Paul Torre, Ormoy; Joël Demit, Tarbes, both of France

[73] Assignee: Association pour la Recherche, France

[21] Appl. No.: 198,087

[22] Filed: Oct. 17, 1980

[30] Foreign Application Priority Data

Oct. 23, 1979 [FR] France .............................. 79 26222

[51] Int. Cl.³ ..................... C01B 21/068; C04B 35/65
[52] U.S. Cl. ....................................... 501/97; 264/65; 423/344; 423/406; 501/98
[58] Field of Search ............... 423/344, 406; 106/73.4, 106/73.5; 264/65; 501/97, 98

[56] References Cited

U.S. PATENT DOCUMENTS

| | | | |
|---|---|---|---|
| 3,892,840 | 7/1975 | Abildtrup | 264/65 X |
| 3,960,581 | 6/1976 | Cutler | 106/73.4 X |
| 4,235,857 | 11/1980 | Mangels | 423/344 |

FOREIGN PATENT DOCUMENTS

| | | | |
|---|---|---|---|
| 44-1701 | 1/1969 | Japan | 423/344 |
| 55-116675 | 9/1980 | Japan | 106/73.5 |

OTHER PUBLICATIONS

"J. of Materials Science", 11, 1976, pp. 1725–1733.

*Primary Examiner*—Jack Cooper
*Attorney, Agent, or Firm*—Sughrue, Mion, Zinn, Macpeak & Seas

[57] ABSTRACT

A method of manufacturing nitrided silicon parts by sintering a silicon powder containing aluminium under an atmosphere rich in nitrogen. A small quantity of carbon monoxide is added to the nitrogen atmosphere and the nitrogen and carbon monoxide partial pressures and the aluminium content of the silicon powder are chosen so that the oxidation reaction by the carbon monoxide on the nitrided silicon formed in the surfaces layers of the parts maintains therein an open porosity which is sufficient to allow the nitrogen to penetrate to the cores of the parts until the parts are homogeneously nitrided. Application to the manufacture of parts which must retain good mechanical strength at high temperature.

3 Claims, No Drawings

METHOD OF MANUFACTURING NITRIDED SILICON PARTS

The present invention relates to a method of manufacturing nitrided silicon parts by sintering silicon powder to which aluminium is added in an atmosphere rich in nitrogen.

BACKGROUND OF THE INVENTION

Silicon nitride obtained by sintering silicon powder under a nitrogen atmosphere has the useful property that it withstands high temperatures. It has been shown that the operation of nitriding silicon requires a very low partial pressure of oxygen to avoid stabilization of a surface layer of silica on the particles of the initial powder. This low oxygen requirement is met by adding hydrogen to the nitriding gas or by adding substances, in particular aluminium, to the initial powder, said substances acting as oxygen traps. Further, adding aluminium after preliminary hot oxidation ensures that parts manufactured therefrom are highly resistant to oxidation. This is described in French patent application No. 79 00268 of Jan. 4, 1979 (published under the No. 2,445,747) corresponding to U.S. Ser. No. 109,713.

Varying the oxygen content of the nitriding gas as a function of the quantity of aluminium added to the initial silicon powder controls the development of the microstructure of parts during sintering, and makes it possible to obtain parts containing only one solid phase, (see Journal of Materials Science, 11, 1976, p. 1725-1733). However, it is very difficult to control the oxygen content of the nitriding gas at the required low-pressure levels (about one tenth of a millibar) in industrial installations. Indeed industrial furnaces with metal heating elements are unsuitable since they cannot withstand the action of oxygen entrained by the nitriding gas. As for furnaces with graphite elements, the chemical equilibrium of carbon, oxygen and carbon oxides keeps the oxygen partial pressure therein to very low limits (about $10^{-5}$ millibars). Under such conditions, the development of the microstructure of the parts during sintering cannot be controlled by acting on the oxygen content of the nitriding gas.

The present invention aims to provide a method in which it is possible in an industrial furnace to control the development of the microstructure of parts made of silicon to which aluminium is added, and consequently to produce homogeneous nitrided silicon parts of low porosity while retaining the advantages obtained by adding the aluminium to the initial silicon, in particular the resistance of the parts to oxidation.

SUMMARY OF THE INVENTION

The present invention provides a method of manufacturing nitrided silicon parts by sintering silicon powder to which aluminium is added under an atmosphere that is rich in nitrogen. A small quantity of carbon monoxide is added to the nitrogen-rich atmosphere and the nitrogen and carbon monoxide partial pressures and the aluminium content of the silicon powder are chosen so that the oxidation reaction by the carbon monoxide on the nitrided silicon formed in the surface layers of the parts maintains therein an open porosity which is sufficient to allow the nitrogen to penetrate to the cores of the parts until the parts are homogeneously nitrided.

Further, it preferentially has at least one of the following features.

The aluminium content of the silicon powder lies between 5% and 15% by weight and the carbon monoxide content of the nitrogen-rich atmosphere is less than 1% by volume.

Sintering is carried out in a graphite furnace.

The silicon powder to which the aluminium has been added undergoes de-aeration in a vacuum at high temperature, prior to the nitriding reaction.

PROBABLE MECHANISMS

Although the mechanisms by which the carbon monoxide acts during nitriding are complex and bring numerous chemical equilibriums into play, and although kinetic considerations must certainly play a part, it seems that the development of the microstructure during nitriding results from competition between two main mechanisms:

firstly, the chemical reactions as a whole cooperate directly to form silicon nitride, with a non-porous structure also being formed; and secondly, the reaction of carbon monoxide on silicon nitride which has already been formed:

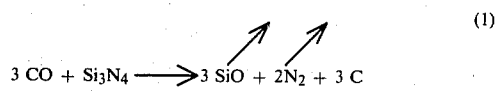

$$3\, CO + Si_3N_4 \longrightarrow 3\, SiO\uparrow + 2N_2\uparrow + 3\, C \tag{1}$$

which results in the volatilization of condensed matter and therefore contributes to the formation of pores or their enlargement.

Either of these mechanisms may predominate depending on the relative values of the carbon monoxide and nitrogen partial pressures at the reaction surface. These partial pressures are determined for a given carbon monoxide content in the atmosphere of the furnace, firstly by the pressure and/or the flow rate of the nitrogen in the furnace and secondly by the proportion of aluminium initially added to the silicon, the aluminium making the carbon monoxide disappear according to the reaction:

$$2Al + CO \rightarrow Al_2O + C \tag{2}$$

possibly together with $$Al_2O + 2CO \rightarrow Al_2O_3 + 2C \tag{3}$$

Thus, with a given quantity of aluminium, when the nitrogen pressure and/or flow rate are too low, in other words when the atmosphere of the furnace is not able to supply the reaction surface with a sufficient quantity of new nitrogen molecules to compensate the consumption of nitrogen by the nitriding reactions, the gas can become locally depleted of nitrogen to such an extent that it causes very large pores to be formed by reaction (1); conversely, if a sufficient quantity of nitrogen is brought in by the atmosphere of the furnace, the reaction (1) may have no chance of taking place.

It might be thought that only the second possibility is advantageous and that it ought to be enhanced. However, the experiments which led to the present invention show that this outlook is wrong. Indeed, the silicon nitride which forms in the upper layers seems to prematurely reduce the open porosity therein hindering the penetration of nitrogen deeper into the parts. In actual fact, for a given carbon monoxide content, there is a value of the nitrogen pressure or flow rate in the furnace for optimising homogeneous nitriding. The smaller the quantity of aluminium which locally keeps the partial pressure of carbon monoxide low, the higher the optimum value.

Although the explanation just given of the mechanisms of carbon monoxide and aluminium actions appears to be correct, it will be understood that the invention is in no way limited thereto.

DETAILED DESCRIPTION OF EXAMPLES

Tests on nitriding silicon powder to which aluminium is added in an industrial furnace with a graphite heating element are described hereinbelow by way of example, the carbon monoxide content of said furnace being 0.9% by volume.

The starting compressed masses (dimensions: $30 \times 30 \times 10$ mm) were obtained by cold pressing silicon powder with a Blaine specific surface area of 12,000 $cm^2/g$ to which 6 or 10% by weight of aluminium is added. These masses were disposed inside a mullite receptacle closed by a cover also made of mullite and placed at the centre of the graphite heating element. Nitriding was carried out without renewal of the furnace's nitrogen atmosphere, simply arranging for the total pressure P to be maintained at a constant value during heat treatment which consisted of a de-aeration step in a vacuum up to a temperature of about 1000° C., followed by the insertion of very pure nitrogen at the pressure P. The temperature was then raised up to 1350° C. and maintained at that level for 3 days. Lastly, the treatment was completed by maintaining the temperature at 1450° C. for 24 hours after which period the furnace was allowed to cool naturally. The pressure P was fixed at 400, 670 or 800 millibars and the carbon monoxide partial pressure was as mentioned hereinabove.

After cutting and polishing the samples, the following micrographic observations were made.

With the smallest quantity of aluminium (6% by weight), at the lowest pressure (400 millibars), there is formed a porous outer zone which reveals the application of reaction (1). In contrast, at the highest pressure (800 millibars), there is formed a dense outer zone which surrounds a more porous zone, revealing the rapid reduction of the porosity in the outer zone, said reduction of the porosity preventing the nitrogen from entering the following zone. Between these two extremes, a pressure of 670 millibars leads to homogeneous samples.

With 10% by weight of aluminium, the defect previously observed at the highest pressure is more intense and is still noticeable at a pressure of 670 millibars. Homogeneous samples are obtained only at a pressure of 400 millibars.

Although the operating conditions which have just been described hereinabove appear to be the most favourable for putting the invention into practice, it will be understood that various modifications can be made thereto without going beyond the scope of the invention. In particular, the optimum pressures given could be modified should a different furnace be used, starting with a silicon powder of different purity or grain size, or should the aluminium content of the powder or the carbon monoxide partial pressure be different.

Likewise, in the previously cited examples, the gas atmosphere is constituted by nitrogen and by carbon monoxide. It will be understood that it is possible to dilute the atmosphere with other gases, in particular with inert gases such as helium, argon, etc., without going beyond the scope of the invention.

The invention applies in particular to manufacturing parts which retain good mechanical strength at high temperature, in particular for high-output gas turbines and diesel engines of the so-called adiabatic type.

We claim:

1. A method of manufacturing nitrided silicon parts comprising:
   sintering a mixture of silicon powder and 5% to 15% by weight of aluminum under an atmosphere that is rich in nitrogen, further containing
   a small quantity of carbon monoxide of less than 1% by volume, and
   controlling the nitrogen and carbon monoxide partial pressures and the aluminum content of said mixture so that the oxidation reaction by the carbon monoxide on the nitrided silicon formed in the surface layers of the parts maintains therein an open porosity which is sufficient to allow the nitrogen to penetrate to the cores of the parts until the parts are homogeneously nitrided.

2. A method according to claim 1, wherein sintering is carried out in a graphite furnace.

3. A method according to claim 1, wherein the mixture of silicon powder and aluminum undergoes deaeration in a vacuum, at a temperature of about 1,000° C., prior to the nitriding reaction.

* * * * *

UNITED STATES PATENT AND TRADEMARK OFFICE
CERTIFICATE OF CORRECTION

PATENT NO. : 4,331,772
DATED : May 25, 1982
INVENTOR(S) : Jean-Paul Torre and Joël Demit It is certified that error appears in the above—identified patent and that said Letters Patent is hereby corrected as shown below:

ON THE TITLE PAGE,

The Assignee should read as follows:

Association pour la Recherche et la Developpment des Methodes et Processus Industriels (ARMINES) and Societe Anonyme dite Ceraver, both of Paris, France Signed and Sealed this First Day of March 1983

[SEAL]

*Attest:*

*Attesting Officer*

GERALD J. MOSSINGHOFF

*Commissioner of Patents and Trademarks*